United States Patent
Katou

(10) Patent No.: US 11,522,350 B2
(45) Date of Patent: Dec. 6, 2022

(54) COATING REMOVING METHOD FOR CABLE AND COATING REMOVING DEVICE FOR CABLE

(71) Applicant: Yazaki Corporation, Tokyo (JP)

(72) Inventor: Sanae Katou, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 230 days.

(21) Appl. No.: 17/005,844

(22) Filed: Aug. 28, 2020

(65) Prior Publication Data

US 2021/0066898 A1   Mar. 4, 2021

(30) Foreign Application Priority Data

Aug. 29, 2019   (JP) .............................. JP2019-157252

(51) Int. Cl.
*H02G 1/12*   (2006.01)

(52) U.S. Cl.
CPC ........... *H02G 1/1265* (2013.01); *H02G 1/127* (2013.01)

(58) Field of Classification Search
CPC .... H02G 1/1235; H02G 1/127; H02G 1/1248; H02G 1/12; H02G 1/1202; H02G 1/1251; H02G 1/1253; H02G 1/1256; H02G 1/1221
USPC ................. 81/9.4, 9.51, 9.41, 9.42
See application file for complete search history.

(56) References Cited

U.S. PATENT DOCUMENTS

| | | | |
|---|---|---|---|
| 3,376,627 A | | 4/1968 | Sitz |
| 4,194,281 A | | 3/1980 | Gudmestad |
| 4,745,828 A | * | 5/1988 | Stepan .................. G02B 6/4497 81/9.42 |
| 5,010,797 A | * | 4/1991 | Stepan .................. H02G 1/1265 83/885 |
| 5,337,633 A | * | 8/1994 | Carpenter .............. H02G 1/127 81/9.51 |
| 5,479,701 A | * | 1/1996 | Yamano ................ H02G 1/1256 81/9.51 |
| 6,360,430 B1 | * | 3/2002 | Stepan .................. H02G 1/1265 29/33 F |
| 2008/0257112 A1 | * | 10/2008 | Stepan .................. G02B 6/4497 81/9.51 |

(Continued)

FOREIGN PATENT DOCUMENTS

DE   1590061 A1   4/1970
DE   29 38 310 A1   4/1980
(Continued)

Primary Examiner — Phong H Nguyen
(74) Attorney, Agent, or Firm — Sughrue Mion, PLLC

(57) ABSTRACT

There is provided a coating moving method for a cable that removes a coating at a terminal portion of a cable, including a step of applying a pressing force having such a magnitude that a cutting edge stops at a position before reaching the core wire to the cutting blade to make an incision on the coating by the cutting blade, a step of twist-cutting an uncut portion of the coating between the cutting edge of the cutting blade and the outer periphery of the core wire by rotating the coating on a distal end side from an incision position with respect to the coating on a base end side, and a step of removing the coating on the distal end side from the incision position by gripping and pulling out the coating on the distal end side from the incision position to expose the core wire.

7 Claims, 9 Drawing Sheets

(56) References Cited

U.S. PATENT DOCUMENTS

2014/0033875 A1* 2/2014 Nakamura ........... H02G 1/1202
          81/9.4

FOREIGN PATENT DOCUMENTS

| DE | 8701734 U1 | 5/1987 |
| DE | 20 2016 008 354 U1 | 9/2017 |
| JP | 2014-33479 A | 2/2014 |

* cited by examiner

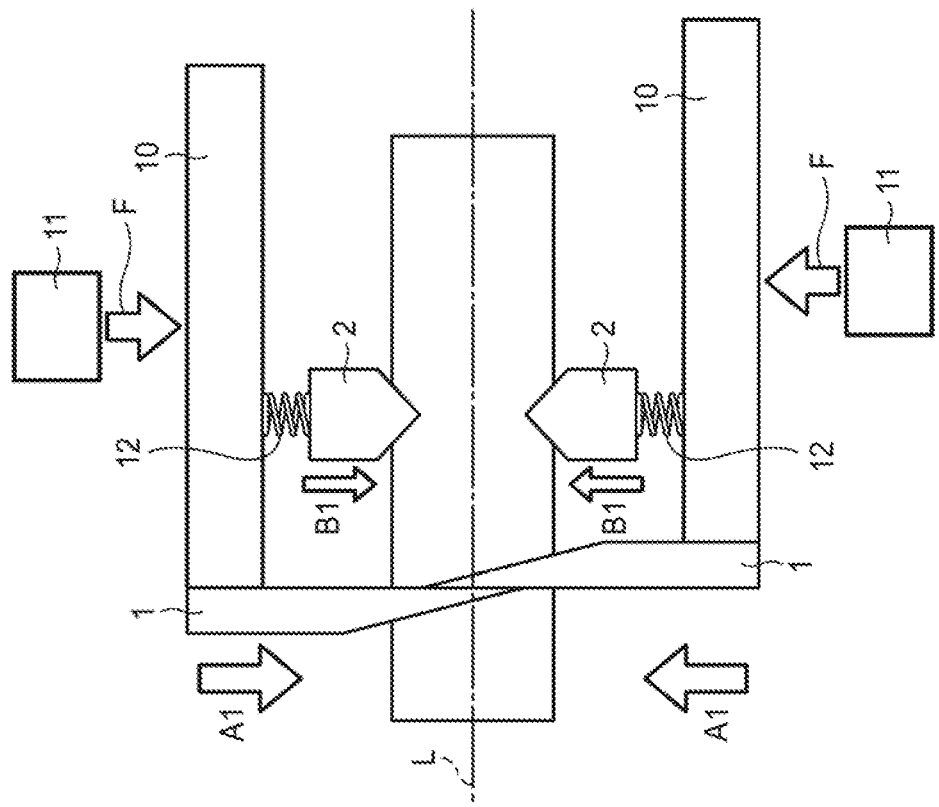

COATING REMOVING METHOD FOR CABLE AND COATING REMOVING DEVICE FOR CABLE

CROSS REFERENCE TO RELATED APPLICATIONS

This application is based on and claims priority from Japanese patent application No. 2019-157252 filed on Aug. 29, 2019, the entire contents of which are incorporated herein by reference.

TECHNICAL FIELD

The present invention relates to a coating removing method for a cable for removing a coating around a core wire to expose the core wire, and a device for implementing the method.

BACKGROUND ART

When a coating around a core wire at a terminal portion of a cable such as an electric wire is removed, a coating removing device including a cutter that moves in a radial direction of the cable is used. In this type of coating removing device of the related art, the coating near a distal end of the cable is cut by sandwiching it with, for example, a pair of cutters, and the cutters are relatively retracted with respect to the coated electric wire in an incision state, so that the coating on a distal end side is stripped off from an incision position. In addition, it is also known that the cutter is rotated when making the incision.

It is desirable to set an incision depth so that a cutting edge of the cutter does not come into contact with the core wire of the electric wire when making an incision on the coating with the cutter, but it is actually difficult to set the incision depth. Therefore, there has been known a method of controlling an incision depth of a cutter by detecting that a cutting edge is in contact with the core wire and an impedance is changed (see, for example, Patent Literature 1).

In addition, there has been also known a method of controlling the incision depth of the cutter by detecting a difference in a shear strength of the coating and a shear strength of the core with a pressure sensor through the cutter or detecting a conductive contact between the cutter and the core wire, a method of setting the incision depth from a nominal diameter, or the like.

CITATION LIST

Patent Literature

[Patent Document 1] JP-A-2014-33479

However, any methods in the related art can reduce a scratch to the core wire due to the cutter, but the core wire is not completely free from the scratch. In particular, since a cross section of the electric wire is often not a clean concentric circle, the cutting edge may bite into the core wire, so that the core wire may be subject to be scratched or a part of the core wire may be cut off.

SUMMARY OF INVENTION

The present invention has been made in view of the above circumstances, and an object of the present invention is to provide a coating removing method for a cable and a coating removing device for a cable that can remove a coating while keeping a core wire in a clean state without scratching the core wire or cutting off a part of the core wire when the coating is stripped off.

A coating removing method for as cable according to the present invention removes a coating on an outer periphery of a core wire at a terminal portion of a cable using a coating removing device for a cable.

The device includes
an urging mechanism configured to apply a pressing force in a cutting direction to a cutting blade,
a rotation mechanism configured to rotate a part of the coating of the cable,
a gripping mechanism configured to grip a part of the coating of the cable, and
a pulling-out mechanism configured to pull out the same coating.

The method comprises
a cutting step of applying a pressing force having such a magnitude that a cutting edge stops at a position before reaching the core wire to the cutting blade by the urging mechanism to make an incision on the coating by the cutting blade,
a twist-cutting step of twist-cutting an uncut portion of the coating between the cutting edge of the cutting blade and the outer periphery of the core wire by rotating the coating on a distal end side from an incision position around an axis of the cable with respect to the coating on a base end side by the rotation mechanism, and
a stripping step of removing the coating on the distal end side from the incision position by gripping and pulling out the coating on the distal end side from the incision position by the gripping mechanism and the pulling-out mechanism to expose the core wire.

A coating removing device for a cable according to the present invention removes a coating on an outer periphery of a core wire at a terminal portion of a cable.

The coating removing device for a cable comprises
a rotary head configured to rotate around a rotation axis set at a fixed position,
a rotation mechanism configured to rotationally driving the rotary head,
a cable holding mechanism configured to hold and fix the terminal portion of the cable in front of the rotary head with being aligned with the rotation axis and a distal end of the cable facing a rear side of the rotary head,
a cutting blade mounted on the rotary head so as to be displaceable in a radial direction of the rotary head, and configured to cause a cutting edge to make an incision on the coating at the terminal portion of the cable by displacing radially inward,
a gripping mechanism arranged on the more distal end side of the cable than the cutting blade and configured to grip the coating,
an opening and/or closing mechanism configured to open the cutting blade and the gripping mechanism radially outward and close the cutting blade and the gripping mechanism radially inward,
an urging mechanism configured to apply a pressing force in a cutting direction to the cutting blade during a closing operation by the opening and/or closing mechanism, and
a pulling-out mechanism having a function of relatively moving the rotary head and the cable holding mechanism along a rotation axis direction and configured to strip off the coating on the distal end side from the incision position by positioning the cutting blade and the gripping mechanism with respect to the cable in an axis direction by moving and stopping and by moving the rotary head and the cable holding mechanism in a direction in which they are separated from each other with the gripping mechanism gripping the coating at the terminal portion of the cable.

BRIEF DESCRIPTION OF DRAWINGS

FIGS. 1A and 1B are explanatory views of a coating removing method according to an embodiment of the present invention, in which FIG. 1A is a transverse sectional view showing a state in which an incision is made on a coating by a cutting blade, and FIG. 1B is a side view at that time.

FIGS. 2A and 2B are explanatory views of a cutting step and a twist-cutting step in the coating removing method according to the embodiment, in which FIG. 2A is a transverse sectional view showing a state in which a cutting edge is cut to a position before the cutting edge of the cutting blade reaches the core wire in the cutting step, FIG. 2B is a transverse sectional view showing a state when twist-cutting is performed by rotating the cutting blade in the twist-cutting step.

FIGS. 3A and 3B are explanatory views of a stripping step in the coating removing method according to the embodiment, in which FIG. 3A is a side view showing a preparation stage of the stripping step after the twist-cutting step is completed, and FIG. 3B is a side view showing a state in which the coating on a distal end side is removed and the core wire is exposed by performing the stripping step.

FIGS. 5A and 5B are views showing a relationship of the forces during the twist-cutting step, in which FIG. 5A is a schematic side sectional view, and FIG. 5B is a schematic transverse sectional view.

DESCRIPTION OF EMBODIMENTS

Specific embodiments of the present invention will be described below with reference to the drawings.

A coating removing method according to the present embodiment is a method of removing a coating (insulating outer sheath) on an outer periphery of a core wire at a terminal portion of an electric wire (cable) within a range of a predetermined length from a distal end using a coating removing device, which will be described below.

The coating removing device generally includes a cutting blade (cutter) that makes an incision on the coating, an urging mechanism that applies a pressing force in a cutting direction to the cutting blade, a rotation mechanism that can rotate a part of the coating of the electric wire, a gripping mechanism that grips a part of the coating of the electric wire, a pulling-out mechanism that pulls out the same coating, and a cable holding mechanism that holds the electric wire to be worked at a fixed position. In the coating removing method of the present embodiment, a cutting step, a twist-cutting step, and a stripping step for the coating are successively performed in this order while holding and fixing the electric wire at a fixed position using the coating removing device.

Figure 2A:
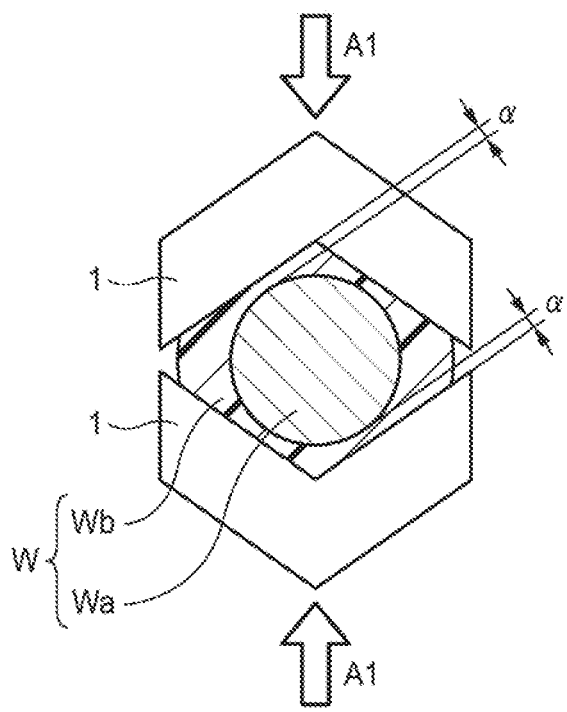
Figure 2B:
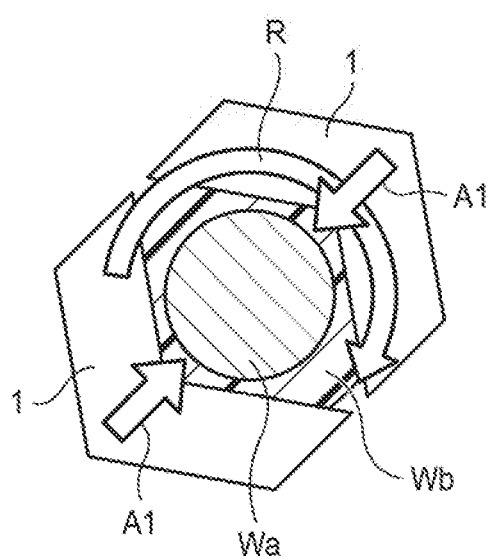
Figure 2C:
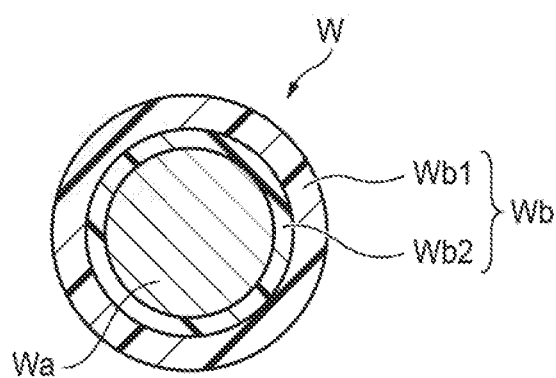
FIG. 2C is a sectional view of the cable showing an appearance of a fracture surface of the coating at a stage when the twist-cutting step is completed.
Figure 3A:
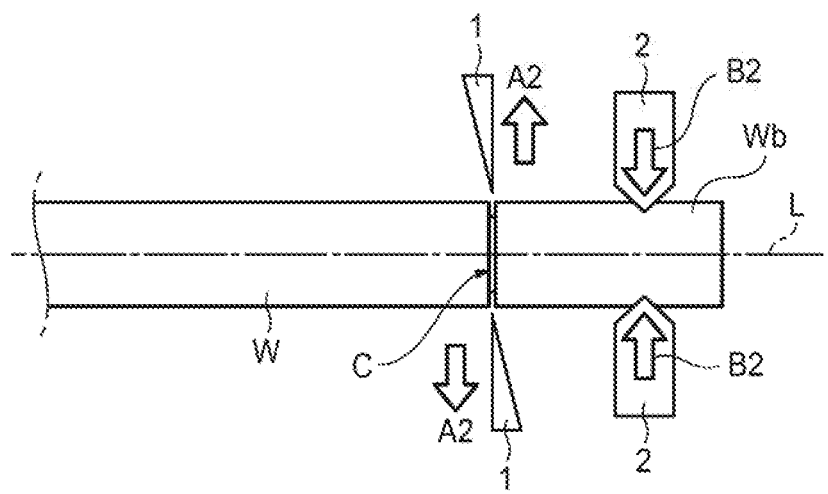
Figure 3B:
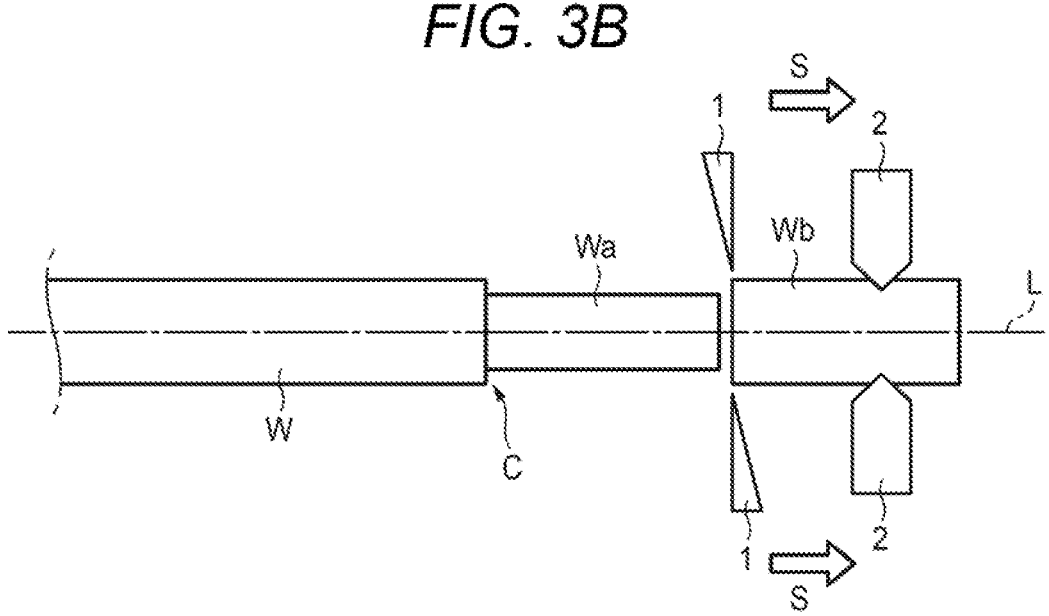

FIGS. 1A and 1B are explanatory views of the coating removing method according to the embodiment of the present invention, in which FIG. 1A is a transverse sectional view showing a state in which an incision is made on the coating by a cutting blade, and FIG. 1B is a side view at that time. FIGS. 2A and 2B are explanatory views of the cutting step and the twist-cutting step in the coating removing method according to the embodiment, in which FIG. 2A is a transverse sectional view showing a state in which a cutting edge is cut to a position before the cutting edge of the cutting blade reaches the core wire in the cutting step, FIG. 2B is a transverse sectional view showing a state when twist-cutting is performed by rotating the cutting blade in the twist-cutting step, and FIG. 2C is a sectional view of the cable showing an appearance of a fracture surface of the coating at a stage when the twist-cutting step is completed. In addition, FIGS. 3A and 3B are explanatory views of the stripping step in the coating removing method according to the embodiment, in which FIG. 3A is a side view showing a preparation stage of the stripping step after the twist-cutting step is completed, and FIG. 3B is a side view showing a state in which the coating on a distal end side is removed and the core wire is exposed by performing the stripping step.

As shown in FIGS. 1A to 2B, an electric wire (cable) to be subjected to coating removing is a single-core electric wire W in which an outer periphery of a core wire (conductor) Wa is surrounded by a coating (insulating resin) Wb. A pair of cutting blades (cutters) 1 is arranged at positions facing each other by 180° with a center of the electric wire W (matching a rotation axis L described later) interposed therebetween. The pair of cutting blades 1 is provided so as to be displaceable in a radial direction with respect to the center of the electric wire W, and is operated to be closed radially inward or to be opened radially outward symmetrically with respect to the center of the electric wire W by an opening and/or closing mechanism. In addition, a cutting edge 1a of each cutting blade 1 is formed into a V-groove shape as viewed from a rotation axis L direction.

As shown in FIG. 1B, the pair of cutting blades 1 is attached to a movable bracket 10, and the pair of cutting blades 1 is opened and/or closed when the movable bracket 10 is opened and/or closed by the opening and/or closing mechanism. In particular, during the closing operation, urging forces F are applied to the movable bracket 10 by urging mechanisms 11 such as a spring or a fluid pressure cylinder (mainly an air cylinder), which applies predetermined pressing forces (urging force) to the cutting blade 1 in cutting directions. In addition, coating chucks (gripping mechanism) 2 are attached to the movable bracket 10 via springs 12, and the coating chucks 2 bite into and separate from the coating Wb following a movement of the movable bracket 10.

As shown in FIGS. 1A, 1B and 2A, in the cutting step, the cutting blades 1 are closed in arrow A1 directions by the opening and/or closing mechanism. Then, by the urging mechanism 11, the pressing force (urging force) F having such a magnitude that the cutting edge 1a stops at a position before reaching the outer periphery of the core wire Wa is applied to the cutting blade 1 to make an incision on the coating Wb by the cutting edge 1a of the cutting blade 1. At this time, the cutting blade 1 is not rotated. The position before reaching the outer periphery of the core wire Wa indicates, for example, a position where an interval α is secured between the outer periphery of the core wire Wa and the cutting edge 1a. Incidentally, the coating chuck 2 arranged on a more distal end side of the electric wire W than the cutting blade 1 is engaged with (movements indicated by arrows B1 in FIG. 1B) the coating Wb on the distal end side with respect to an incision position by an appropriate urging force.

Next, in the twist-cutting step, as indicated by an arrow R in FIG. 2B, the coating on the distal end side with respect to the incision position is rotated around an axis of the electric wire (rotation axis L) with respect to the coating on a base end side by a rotation mechanism. Accordingly, an uncut portion of the coating between the cutting edge 1a of the cutting blade 1 and the outer periphery of the core wire Wa is twist-cut. That is, as shown in FIG. 2C, in a first cutting step, a portion Wb1 on the substantially outer peripheral side of the coating Wb is cut. Next, in the twist-cutting step, a coating Wb2 of a remaining portion is twist-cut. As a result, the coating on the distal end side is reliably cut from the coating on the base end side from the incision position.

In the next stripping step, as shown in FIG. 3A, the coating chuck 2 reliably grips the coating Wb on the distal end side with respect to an incision position C (operation of arrows B2) and opens the cutting blade 1 (arrows A2). Then, as shown in FIG. 3B, in this state, the coating chuck 2 is moved together with the cutting blade 1 and the movable bracket 10 in an arrow S direction by a pulling-out mechanism, the coating Wb on the distal end side is removed from the incision position C to expose the core wire Wa. This completes a coating removing work.

By the way, in the twist-cutting step, the following cases (1) to (3) can be considered in order to rotate the coating on the distal end side with respect to the coating on the base end side from the incision position. These cases includes:

(1) a case of applying a torque to the coating on the distal end side by rotating the cutting blade 1;

(2) a case of applying a torque to the coating on the distal end side by rotating the coating chuck 2; and (3) a case of applying a torque to the coating on the distal end side by rotating both of the cutting blade and the coating chuck 2.

In the case (1), in the twist-cutting step, while keeping the pressing force applied to the cutting blade 1 at the end of the cutting step, the cutting blade 1 is rotated around the axis of the electric wire by the rotation mechanism, so that the coating on the distal end side is rotated from the incision position with respect to the coating on the base end side due to friction generated between the cutting blade 1 and the coating Wb. As a result, a twisting torque is introduced into the uncut portion of the coating (the coating remaining portion) between the cutting edge 1a of the cutting blade 1 and the outer periphery of the core wire Wa to twist-cut the uncut portion.

In the case (2), after the cutting blade 1 is opened after the cutting step, the coating chuck 2 is rotated around the axis of the electric wire by the rotation mechanism in the twist-cutting step with the coating chuck (gripping mechanism) 2 gripping the coating on the distal end side with respect to the incision position, so that the coating on the distal end side is rotated from the incision position with respect to the coating on the base end side. As a result, a twisting torque is introduced into the uncut portion of the coating (the coating remaining portion) between the cutting edge 1a of the cutting blade 1 and the outer periphery of the core wire Wa to twist-cut the uncut portion.

In the case (3), in the twist-cutting step, while keeping the pressing force applied to the cutting blade 1 at the end of the cutting step, the cutting blade 1 is rotated around the axis of the electric wire by the rotation mechanism, and the coating chuck 2 is rotated around the axis of the electric wire by the rotation mechanism with the coating chuck (gripping mechanism) 2 gripping the coating on the distal end side with respect to the incision position. As a result, a twisting torque is introduced into the uncut portion of the coating (the coating remaining portion) between the cutting edge 1a of the cutting blade 1 and the outer periphery of the core wire Wa to twist-cut the uncut portion.

Here, when a waterproof plug is attached to an end portion of the coating Wb after the stripping and the terminal is caulked in this state, if a coating material has a jagged cross section, an accuracy at an attachment position of the waterproof plug may decrease, and a waterproof function after caulking the terminal may deteriorate. In any of the above cases (1) to (3), since the force (pressing force) F required for the incision is applied to the cutting blade 1 by the urging mechanism, and the cutting blade 1 is rotated around the axis L of the electric wire while maintaining an incision depth h, the cross section of the coating material obtained by the stripping step can be made smooth without scratching the core wire Wa with the cutting blade 1. In the following, the case (3) will be further examined, but the force F required for the incision is also applied to the case (1) or (2).

Figure 4:
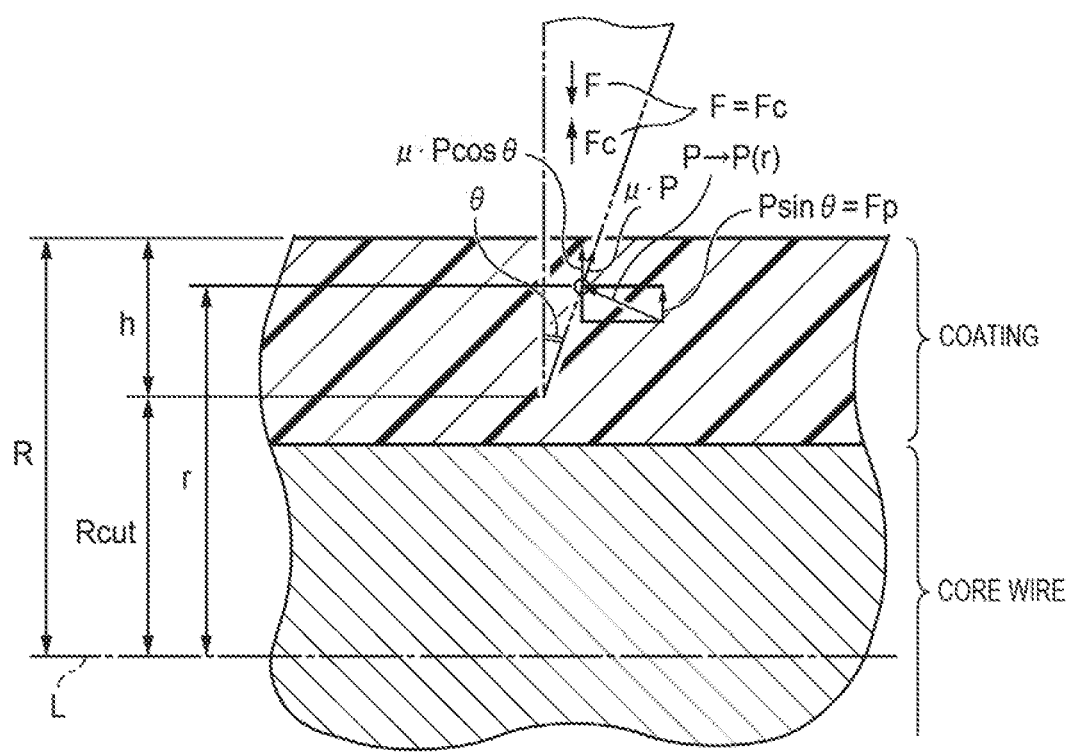
FIG. 4 is a schematic side sectional view showing a relationship of forces during the cutting step.

FIG. 4 is a schematic side sectional view showing a relationship of forces during the cutting step.

First, the following formula is established between a cutting force F applied to the cutting blade 1 when making the incision on the coating Wb and a reaction force (resistive force) Fc acting on the cutting blade 1 from the coating Wb at that time.

$$F=Fc$$

Next, considering Fc, the following formula is satisfied.

$$Fc=Ff+Fp$$

in which Ff represents a component force of a frictional force generated between the cutting blade and the coating material in the cutting direction, and Fp represents a reaction force in the cutting direction received by the cutting blade from the coating material.

As can be seen from FIG. 4, Ff and Fp can be expressed by the following Formulas (1) and (2).

[Formula 1]

$$F_f = \int_0^h p\mu \cos\theta \, dA \quad (1)$$

[Formula 2]

$$F_p = \int_0^h p \sin\theta \, dA \quad (2)$$

in which θ represents a cutting edge angle of the cutting blade,

P represents a drag force acting perpendicular to a blade surface of the cutting blade, μ represents a friction coefficient between the cutting blade and the coating, h represents a distance from a tip end of the cutting blade (incision depth), and dA represents a contact area between the cutting blade and the coating material.

the drag force P acting perpendicular to the blade surface of the cutting blade 1 when making the incision can be expressed by a function P(r), in which r is a distance in the radial direction from the center L of the cable. In general, due to a relationship between a required strength and flexibility in terms of characteristics of the electric wire, a thin electric wire has a large drag force P, and a thick electric wire has a small drag force P. When the force (pressing force) F required for the incision is obtained based on the above formulas, the following Formula (3) is obtained.

[Formula 3]

$$F = F_c \qquad (3)$$
$$= F_f + F_p$$
$$= \mu \cos\theta \int_0^h p(r)dA + \sin\theta \int_0^h p(r)dA$$
$$= (\mu\cos\theta + \sin\theta)\int_0^h p(r)dA$$

Next, the twist-cutting (torsional shearing) due to a frictional force ($\mu$P) between the cutting blade 1 and the coating Wb will be examined.

Figure 5:
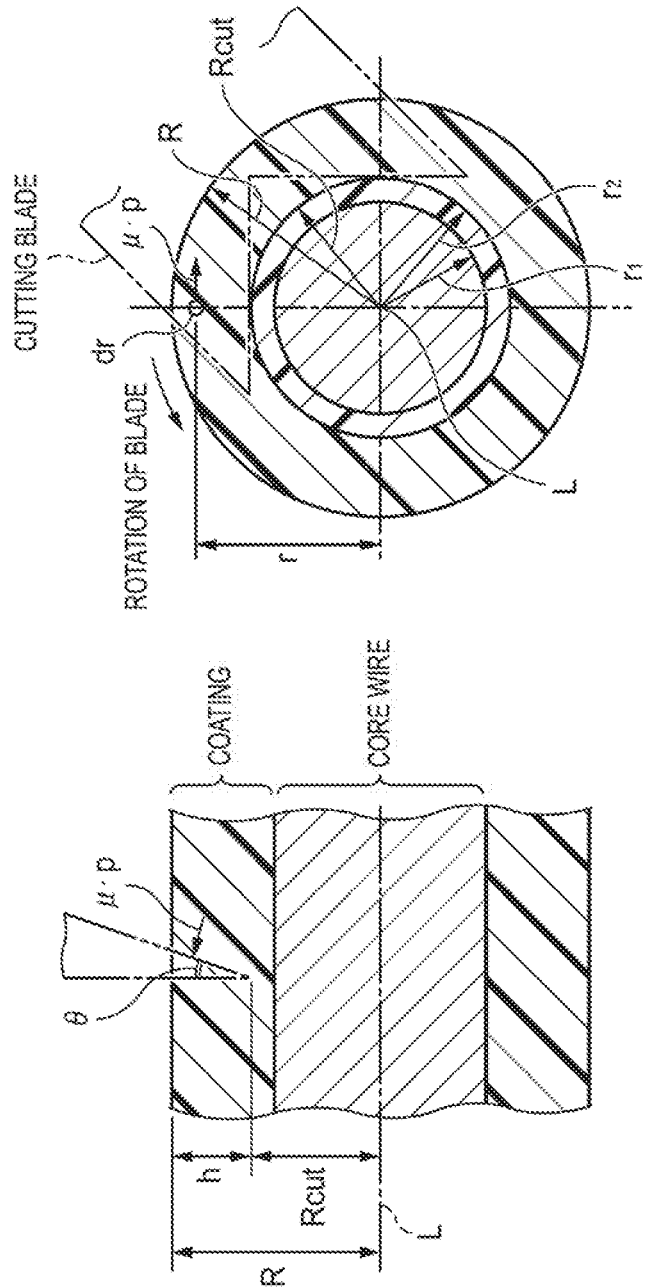

FIGS. 5A and 5B are views showing a relationship of the forces during the twist-cutting step, in which FIG. 5A is a schematic side sectional view, and FIG. 5B is a schematic transverse sectional view.

First, as a premise, as shown in FIG. 5A, the incision depth h of the cutting blade 1 in the cutting step is set before the tip end of the cutting edge 1$a$ of the cutting blade 1 reaches the core wire Wa. In this state, the cutting blade 1 is rotated around the axis L of the electric wire while maintaining the cutting force (pressing force) F and the incision depth h. At this time, the coating chuck 2 is also rotated. Then, due to the frictional force $\mu$P acting between the cutting blade 1 and the coating Wb, a torsional torque is generated in the remaining uncut coating Wb2, and the remaining uncut coating Wb2 is twist-cut as the torsional torque increases. A force (torsional shear force) required to be twist-cut can be obtained as follows.

The frictional force f in the rotation direction generated by the drag P acting perpendicular to the blade surface of the cutting blade is as follows:

$$f = \mu \cdot P \cdot dA.$$

The torque Tf generated thus is represented by $$Tf = f \cdot r = \mu \cdot P \cdot dA \cdot r.$$

Here, since $dA = 2\pi \cdot dr$ can be calculated, the above formula becomes $$Tf = \mu \cdot P \cdot 2\pi r \cdot dr \cdot r = \mu \cdot P \cdot 2\pi r^2 \cdot dr.$$

When the total torque (torsional torque) Tallf due to the frictional force is calculated, the following formula is derived.

[Formula 4]

$$T_{allf} = \int f \cdot r \qquad (4)$$
$$= \mu \cdot 2\pi \int_{Rcut}^{R} p(r) \cdot r^2 dr$$

in which R represents a distance from the center of the electric wire to the outer periphery of the coating, and Rcut represents a distance from the center of the electric wire to an incision tip end.

A condition for the material in the remaining portion to be torsionally sheared by the above torsional torque, that is, the torque T required to shear the remaining portion, is expressed by the following formula.

[Formula 5]

$$T = \tau \cdot Z_p \qquad (5)$$
$$= \tau \cdot \pi\left(\frac{r_2^4 - r_1^4}{r_2}\right)$$

in which $\tau$ represents a torsional shear strength inherent in the coating material, Zp represents a polar cross modulus of the material residue, r1 represents an inner diameter of the material residue, and r2 represents an outer diameter of the material residue.

Therefore, if the following expression is satisfied, it can be said that shearing (twist-cutting) is established.

[Expression 6]

$$T_{allf} > T \qquad (6)$$

As described above, by decreasing Rcut of the Formulas (4) and (5) (increasing the incision depth h and bringing it closer to core wire) so as to satisfy Expression (6), a value of Formula (4) becomes larger and a value of Formula (5) becomes larger, resulting in easier threading of the residual coating. Then, when the incision depth h (=R−Rcut) is determined, an incision pressure (pressing force to the cutting blade 1) F=Fc for achieving the incision depth is obtained, and the pressure of the urging mechanism (spring force or cylinder) that pushes the cutting blade 1 is set so that Fc is applied.

That is, with the torque Tallf larger than the required torque T for twist-cutting the uncut portion (coasting remaining portion) of the coating between the cutting edge 1$a$ of the cutting blade 1 and the outer periphery of the core wire Wa after the cutting step, the incision depth h of the cutting blade 1 is calculated as a condition for rotating the coating on the distal end side with respect to the coating on the base end side from the incision position. Further, in the cutting step, the pressing force capable of realizing the calculated incision, depth h is applied to the cutting blade 1 by the urging mechanism.

As described above, the urging force applied to the cutting blade 1 is set such that the incision depth reaches a planned incision depth (a depth at which the cutting edge does not reach the core wire). The urging force is set such that the incision depth becomes large within a range that does not reach the core wire Wa as much as possible. As a result, reliable twist-cutting can be performed while improving quality of the fracture surface of the coating.

In a configuration of FIG. 1B, the sum of a force Fcut applied to the cutting blade 1 and a force Fch applied to the coating chuck 2 becomes the urging force applied to the bracket (spring force Fsp or cylinder propulsion force Fcyl).

Next, an additional explanation of the device and method will be given with reference to the drawing of the actual machine.

Figure 6:
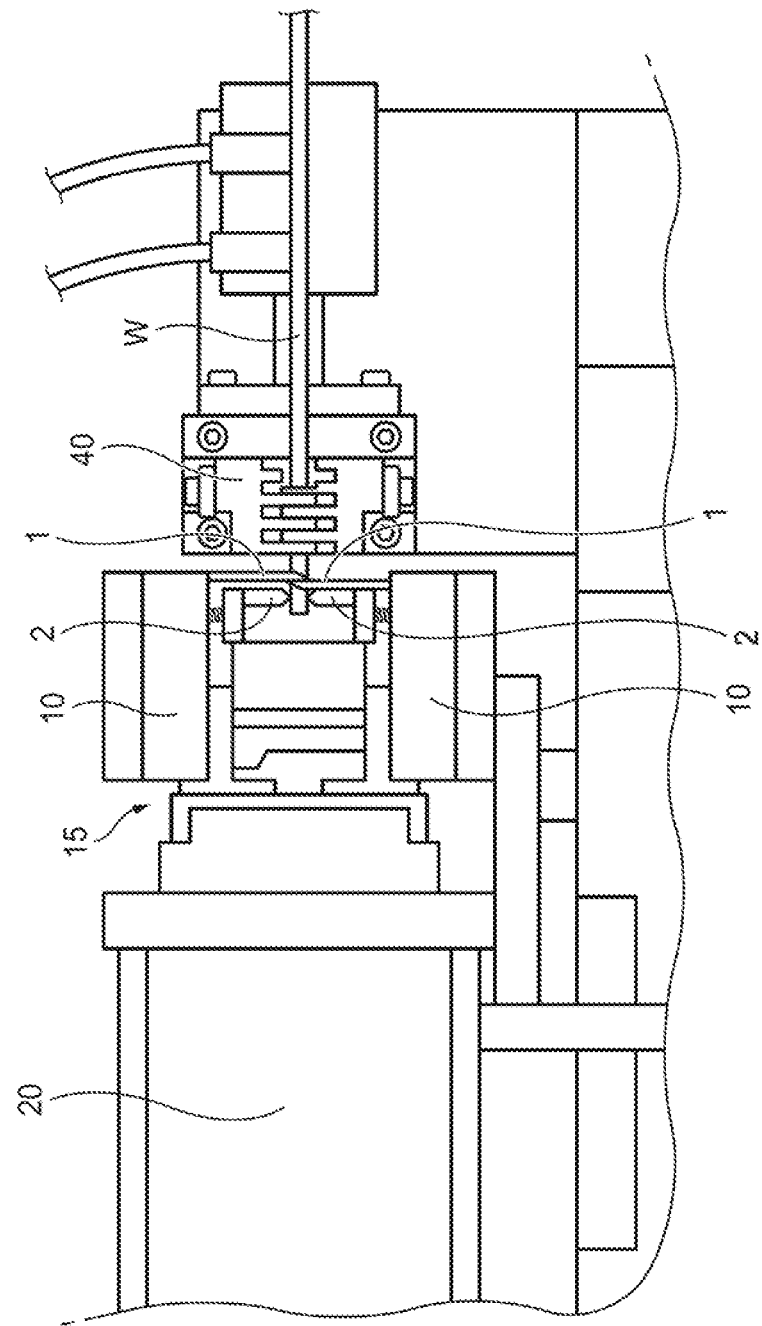
FIG. 6 is a plan view of a main part of a coating removing device according to an embodiment as viewed from above.
Figure 7:
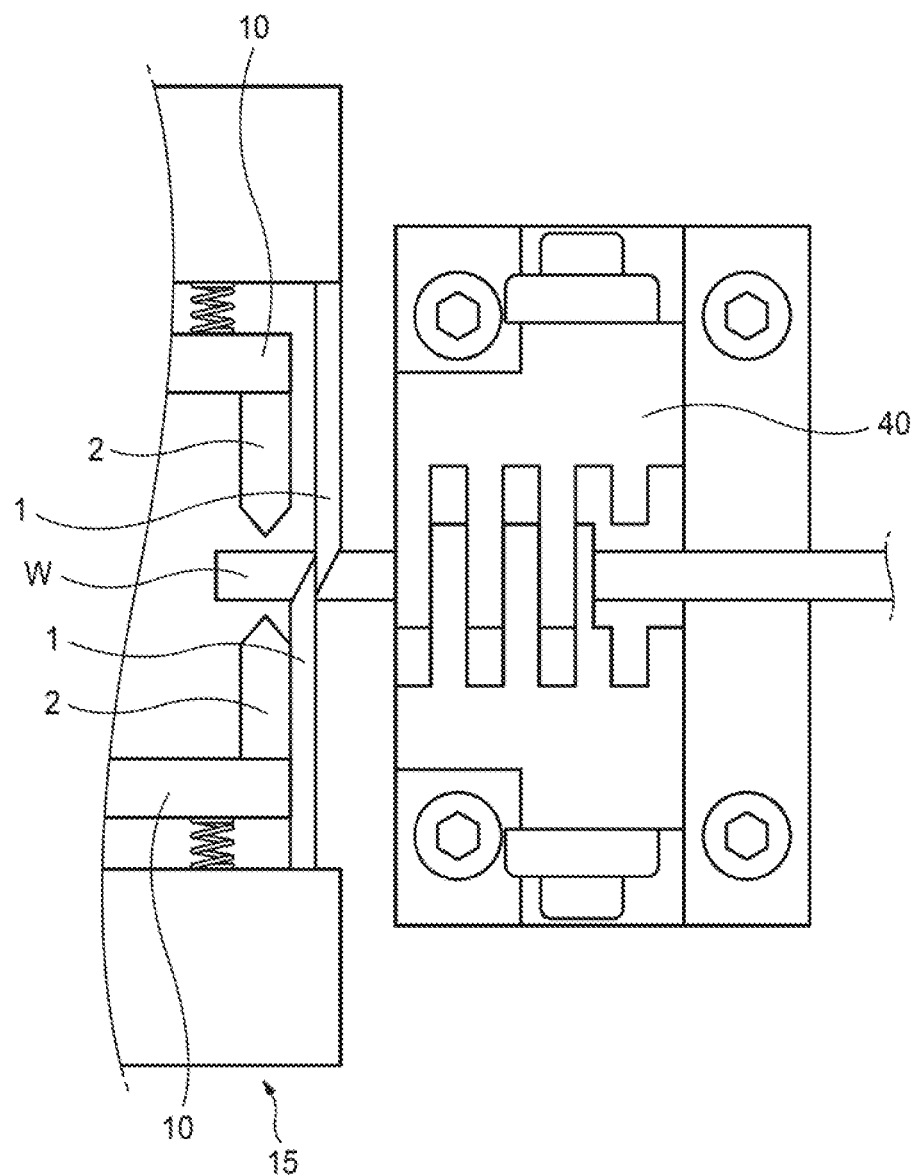
FIG. 7 is an enlarged plan view showing a state before performing the cutting step as viewed from above.
Figure 8:
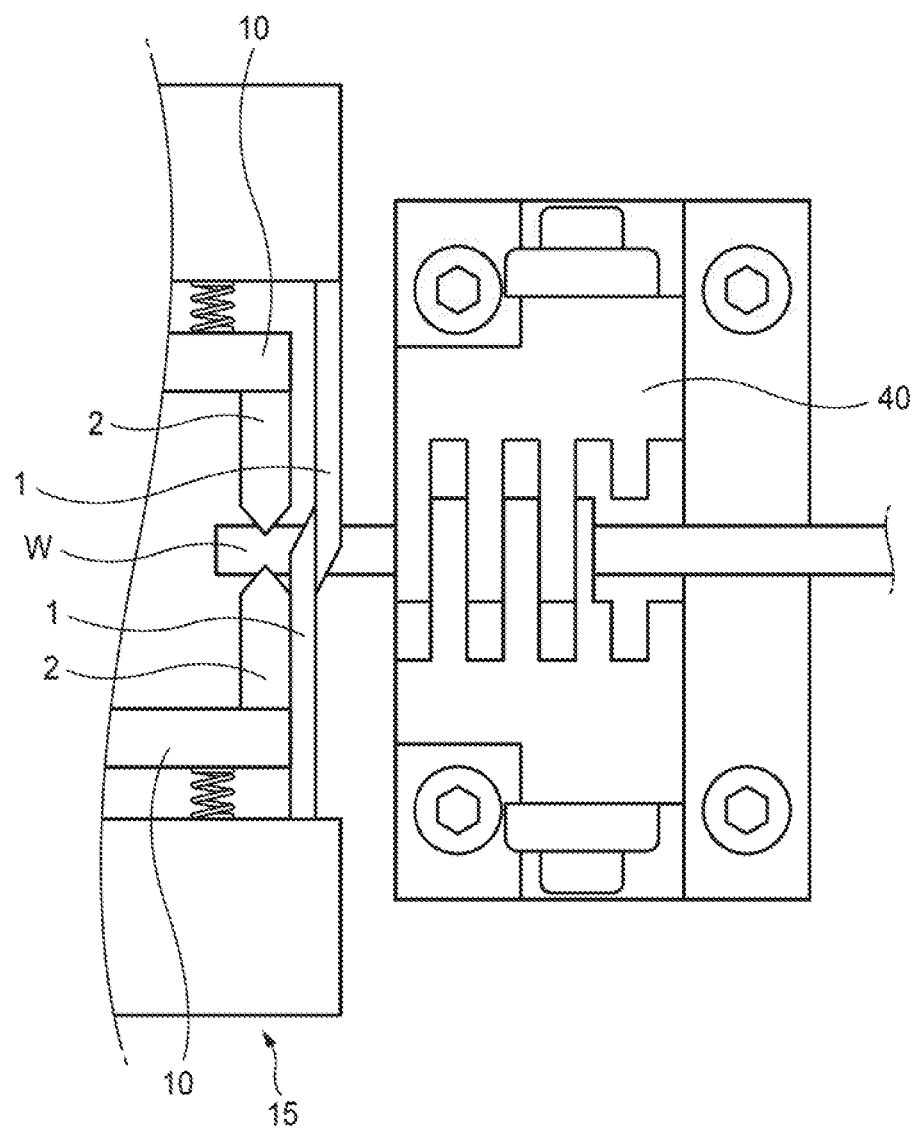
FIG. 8 is an enlarged plan view showing a state in which the cutting step and the twist-cutting step are performed.
Figure 9:
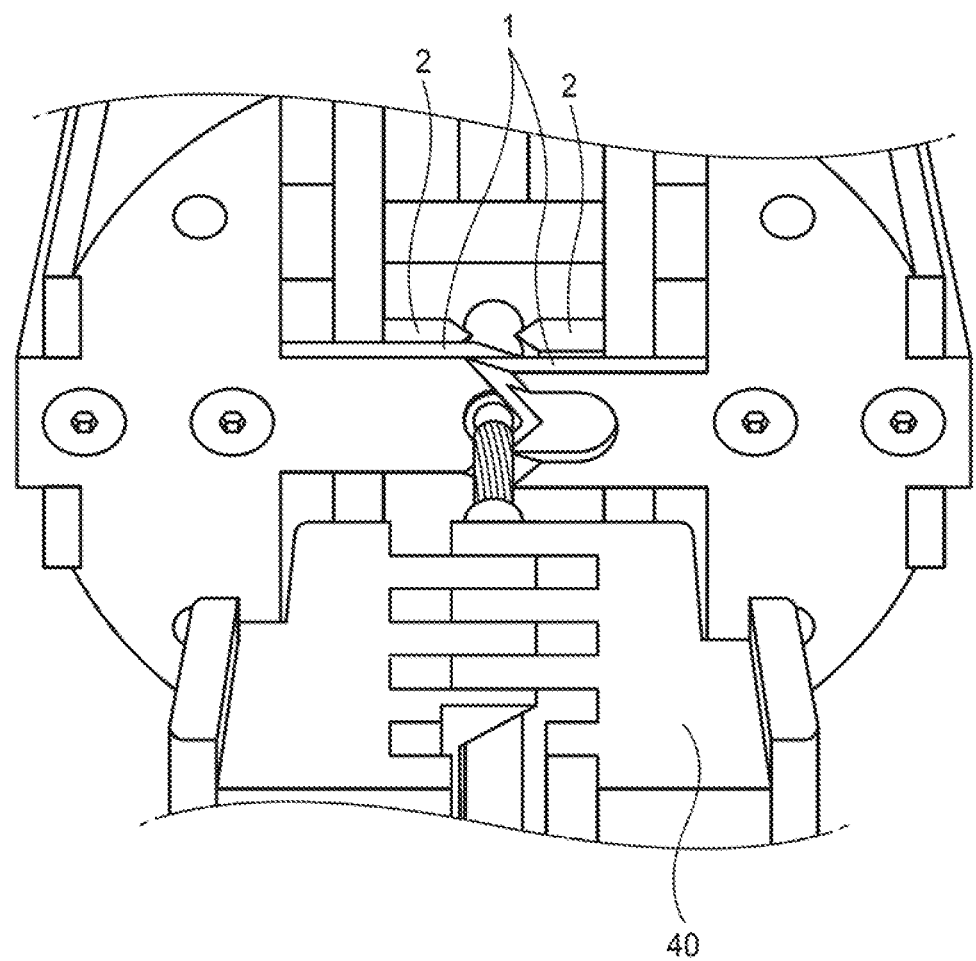
FIG. 9 is a perspective view viewed from a front side showing a state in which the stripping step is performed.

FIG. 6 is a plan view of a main part of the coating removing device according to an embodiment as viewed from above. FIG. 7 is an enlarged plan view showing a state before performing the cutting step as viewed from above. FIG. 8 is an enlarged plan view showing a state in which the cutting step and the twist-cutting step are performed. FIG. 9 is a perspective view viewed from a front side showing a state in which the stripping step is performed.

As shown in FIGS. 6 to 9, the coating removing device according to the present embodiment includes a rotary head 15 that rotates around a rotation axis set at a fixed position, a rotation mechanism (motor) 20 that rotationally drives the head, a cable holding mechanism 40 that holds and fixes the terminal portion of the cable in front of the rotary head 15 with being aligned with the rotation axis and the distal end of the cable facing the rear of the rotary head, the cutting blade 1 that is mounted on the rotary head 15 so as to be displaceable in a radial direction of the rotary head 15, and causes the cutting edge to make the incision on the coating at the terminal portion of the cable held by the cable holding mechanism 40 by displacing radially inward, the gripping mechanism (coating chuck 2) that is arranged on the more distal end side of the cable than the cutting blade 1 and grips the coating, the opening and/or closing mechanism that opens the cutting blade 1 and the gripping mechanism (coating chuck 2) radially outward and closes the cutting blade 1 and the gripping mechanism (coating chuck 2) radially inward, the urging mechanism that applies the pressing force in the cutting direction to the cutting blade 1 during the closing operation by the opening and/or closing mechanism, and an axial movement mechanism that has a function of relatively moving the rotary head 15 and the cable holding mechanism 40 along a rotation axis direction and a function as the pulling-out mechanism that strips off the coating on the distal end side from the incision position by positioning the cutting blade 1 and the gripping mechanism (coating chuck 2) with respect to the cable in the axis direction by moving and stopping and by moving the rotary head 15 and the cable holding mechanism 40 in a direction in which they are separated from each other with the gripping mechanism (coating chuck 2) gripping the coating at the terminal portion of the cable.

In the above-described embodiments, the case where the coating (insulating outer sheath) around the core wire of the single-core coated electric wire is mainly removed has been described, but in addition to the normal insulating outer sheath of the single-core coated electric wire, the coating to be removed includes a dielectric material around an inner conductor (center conductor) corresponding to the core wire as long as the cable is a coaxial cable. Alternatively, in addition to the dielectric, an outer conductor (braided wire and aluminum foil) around the dielectric and the insulating outer sheath on the outside thereof are included. In short, which range is referred to as a core wire and which range is referred to as a coating is determined by a work case.

In the above-described embodiments, the case where the cable is an electric wire has been described, but an optical cable other than the electric wire is also included in a work target.

In the above-described embodiments, a case where the cable holding mechanism 40 is fixedly provided, and the rotary head 15 moves forward and backward with respect to the cable holding mechanism 40 has been described, but the cable holding mechanism 40 side may be moved. That is, it is sufficient that the cable holding mechanism 40 and the rotary head 15 move relative to each other in an approaching direction and a separating direction.

According to the coating removing method for a cable described above, when the coating Wb is cut, instead of pulling and cutting (tearing off) the coating Wb at the portion where the incision is made, the coating Wb is twisted and cut (twisted off) in the state in which the incision is made, so that a clean fracture surface can be made. In addition, the unnecessary coating Wb is pulled out and stripping off after the twist-cutting, so that the core wire Wa can be exposed cleanly without applying an unnecessary force to the core wire Wa.

Further, when the incision is made on the coating Wb, an incision pressure applied to the cutting blade 1 is set to be lower than an incision pressure for the core wire Wa, so that it is possible to prevent the core wire Wa from being scratched and the core wire Wa from being broken. Therefore, it is possible to solve the trouble in the coating removing work.

The incision is made on the coating Wb such that the cutting edge 1a of the cutting blade 1 does not reach the core wire Wa, so that damage to the cutting blade 1 can be reduced. When the unnecessary coating Wb is pulled out after the coating Wb is cut, the coating Wb is held and pulled out by the coating chuck 2 (gripping mechanism) provided separately from the cutting blade 1, so that damage to the cutting blade can be further reduced. Therefore, durability of the cutting blade 1 can be improved.

In addition, a detection unit or a positioning mechanism for setting the incision depth is not used when the incision is made on the coating Wb, so that the configuration including the control can be simplified and the cost can be reduced.

Furthermore, since the force (urging force) applied to the cutting blade 1 is set instead of setting the incision depth for each cable when the incision is made on the coating Wb, there is no need to make settings or adjustments for each cable type and size, which simplifies a preparation work and shortens preparation time.

Further, when the twisting torque is transmitted to a planned twist-cutting position of the coating Wb due to the friction between the cutting blade 1 and the coating Wb by the rotation of the cutting blade 1, the coating can be twist-cut at the incision position only by rotating the cutting blade 1.

When the twisting torque is transmitted to the planned twist-cutting position of the coating Wb by the rotation of the coating chuck 2 (gripping mechanism), the coating can be twist-cut at the incision position only by rotating the coating chuck 2 (gripping mechanism).

According to the coating removing method described above, by setting the pressing force of the cutting blade 1 so that the incision depth becomes as large as possible within the range where the cutting edge 1a does not reach the core wire Wa, the twist-cutting of the coating can be facilitated, and quality of a cut surface can be improved.

According to the device of the above-described embodiment, the application of the pressing force to the cutting blade 1 can be easily performed by a spring or a fluid pressure cylinder.

A coating removing method for a cable that removes a coating (Wb) on an outer periphery of a core wire at a terminal portion of a cable (W) using a coating removing device for a cable,
the device including:
an urging mechanism (11) configured to apply a pressing force in a cutting direction to a cutting blade (1);
a rotation mechanism configured to rotate a part of the coating (Wb) of the cable (W);
a gripping mechanism (coating chuck 2) configured to grip a part of the coating of the cable; and
a pulling-out mechanism configured to pull out the same coating,
the method including:

a cutting step of applying a pressing force having such a magnitude that a cutting edge (1a) stops at a position before reaching the core wire (Wa) to the cutting blade (1) by the urging mechanism to make an incision on the coating by the cutting blade (1);

a twist-cutting step of twist-cutting an uncut portion of the coating between the cutting edge (1a) of the cutting blade (1) and the outer periphery of the core wire (Wa) by rotating the coating (Wb) on a distal end side from an incision position around an axis (L) of the cable with respect to the coating (Wb) on a base end side by the rotation mechanism; and a stripping step of removing the coating (Wb) on the distal end side from the incision position by gripping and pulling out the coating (Wb) on the distal end side from the incision position by the gripping mechanism (2) and the pulling-out mechanism to expose the core wire (Wa).

According to the cable coating removing method for a cable, when the coating is cut, instead of pulling and cutting (tearing off) the coating at a portion where the incision is made, the coating is twisted and cut (twisted off) in the state in which the incision is made, so that a clean fracture surface can be made. In addition, the unnecessary coating is pulled out and stripping off after the twist-cutting, so that the core wire can be exposed cleanly without applying an unnecessary force to the core wire.

Further, when the incision is made on the coating, an incision pressure applied to the cutting blade is set to be lower than an incision pressure to reach the core wire, so that it is possible to prevent the core wire from being scratched and the core wire from being broken. Therefore, reliability of the electric wire can be improved.

The incision is made on the coating such that the cutting edge of the cutting blade does not reach the core wire, so that damage to the cutting blade can be reduced. When the unnecessary coating is pulled out after the coating is cut, the coating is held and pulled out by the gripping mechanism provided separately from the cutting blade, so that damage to the cutting blade can be further reduced. Therefore, durability of the cutting blade can be improved.

In addition, a detection unit or a positioning mechanism for setting the incision depth is not used when the incision is made on the coating, so that a configuration including a control of the mechanism can be simplified and the cost can be reduced.

Furthermore, since the force applied to the cutting blade is set instead of setting the incision depth for each cable when the incision is made on the coating, there is no need to make settings or adjustments for each cable type and size, which simplifies a preparation work and shortens preparation time.

In the twist-cutting step, the cutting blade (1) may be opened in a state in which the coating (Wb) on the distal end side with respect to the incision position is gripped by the gripping mechanism (2), and the gripping mechanism (2) may be rotated around the axis (L) of the cable by the rotation mechanism.

Since the twisting torque is transmitted to a planned twist-cutting position of the coating by the rotation of the gripping mechanism, the coating can be twist-cut at the incision position only by rotating the gripping mechanism.

In the twist-cutting step, while keeping the pressing force applied to the cutting blade at the end of the cutting step, the cutting blade (1) may be rotated around the axis (L) of the cable by the rotation mechanism to rotate the coating on the distal end side with respect to the coating on the base end side from the incision position due to friction generated between the cutting blade (1) and the coating (Wb), and therefore a twisting torque is introduced into the uncut portion of the coating (Wb) between the cutting edge (1a) of the cutting blade (1) and the outer periphery of the core wire (Wa) to twist-cut the uncut portion.

Since the twisting torque is transmitted to the planned twist-cutting position of the coating due to the friction between the cutting blade and the coating by the rotation of the cutting blade, the coating can be twist-cut at the incision position only by rotating the cutting blade.

With the torque larger than a required torque for twist-cutting the uncut portion of the coating (Wb) between the cutting edge (1a) of the cutting blade (1) and the outer periphery of the core wire (Wa) after the cutting step, an incision depth of the cutting blade (1) may be calculated as a condition for rotating the coating (Wb) on the distal end side with respect to the coating (Wb) on the base end side from the incision position, and in the cutting step, the pressing force capable of realizing the calculated incision depth may be applied to the cutting blade (1) by the urging mechanism.

By setting the pressing force of the cutting blade so that the incision depth becomes as large as possible within a range where the cutting edge does not reach the core wire, the twist-cutting of the coating can be facilitated, and quality of a cut surface can be improved.

A coating removing device for a cable that removes a coating (Wb) on an outer periphery of a core wire (Wa) at a terminal portion of a cable (W), the coating removing device for a cable including:

a rotary head (15) configured to rotate around a rotation axis (L) set at a fixed position;

a rotation mechanism (20) configured to rotationally driving the rotary head;

a cable holding mechanism (40) configured to hold and fix the terminal portion of the cable in front of the rotary head (15) with being aligned with the rotation axis and a distal end of the cable facing a rear side of the rotary head;

a cutting blade (1) mounted on the rotary head (15) so as to be displaceable in a radial direction of the rotary head (15), and configured to cause a cutting edge to make an incision on the coating at the terminal portion of the cable by displacing radially inward;

a gripping mechanism (2) arranged on the more distal end side of the cable than the cutting blade and configured to grip the coating;

an opening and/or closing mechanism configured to open the cutting blade (1) and the gripping mechanism (2) radially outward and close the cuffing blade (1) and the gripping mechanism (2) radially inward;

an urging mechanism configured to apply a pressing force in a cutting direction to the cutting blade during a closing operation by the opening and/or closing mechanism; and a pulling-out mechanism having a function of relatively moving the rotary head and the cable holding mechanism along a rotation axis direction and configured to strip off the coating on the distal end side from the incision position by positioning the cutting blade and the gripping mechanism with respect to the cable in an axis direction by moving and stopping and by moving the rotary head and the cable holding mechanism in a direction in which they are separated from each other with the gripping mechanism gripping the coating at the terminal portion of the cable.

According to the coating removing device for a cable, the above method can be performed, and a resulting effect can be obtained.

At least one of a spring and a fluid pressure cylinder may be provided as the urging mechanism (11).

The application of the pressing force to the cutting blade can be easily performed by a spring or a fluid pressure cylinder.

According to the present invention, it is possible to remove the coating while keeping the core wire in the clean state without scratching the core wire or cutting off a part of the core wire when the coating is stripped off.

What is claimed is:

1. A coating removing method for a cable that removes a coating on an outer periphery of a core wire at a terminal portion of a cable using a coating removing device for a cable,
the device including:
an urging mechanism configured to apply a pressing force in a cutting direction to a cutting blade;
a rotation mechanism configured to rotate a part of the coating of the cable;
a gripping mechanism configured to grip a part of the coating of the cable; and
a pulling-out mechanism configured to pull out the same coating, the method comprising:
a cutting step of applying, to the cutting blade and the gripping mechanism, a pressing force, having such a magnitude that a cutting edge stops at a position before reaching the core wire, by the urging mechanism to make an incision on the coating by the cutting blade;
a twist-cutting step of twist-cutting an uncut portion of the coating between the cutting edge of the cutting blade and the outer periphery of the core wire by rotating the coating on a distal end side from an incision position around an axis of the cable with respect to the coating on a base end side by the rotation mechanism; and
a stripping step of removing the coating on the distal end side from the incision position by gripping and pulling out the coating on the distal end side from the incision position by the gripping mechanism and the pulling-out mechanism to expose the core wire,
wherein the stripping step comprises opening, from the position, the cutting blade radially outward and away from the coating while maintaining a grip on the coating by the gripping mechanism.

2. The coating removing method for a cable according to claim 1,
wherein in the twist-cutting step, the cutting blade is opened in a state in which the coating on the distal end side with respect to the incision position is gripped by the gripping mechanism, and the gripping mechanism is rotated around the axis of the cable by the rotation mechanism.

3. The coating removing method for a cable according to claim 1,
wherein in the twist-cutting step, while keeping the pressing force applied to the cutting blade at the end of the cutting step, the cutting blade is rotated around the axis of the cable by the rotation mechanism to rotate the coating on the distal end side with respect to the coating on the base end side from the incision position due to friction generated between the cutting blade and the coating, and therefore a twisting torque is introduced into the uncut portion of the coating between the cutting edge of the cutting blade and the outer periphery of the core wire to twist-cut the uncut portion.

4. The coating removing method for a cable according to claim 3,
wherein with the torque larger than a required torque for twist-cutting the uncut portion of the coating between the cutting edge of the cutting blade and the outer periphery of the core wire after the cutting step, an incision depth of the cutting blade is calculated as a condition for rotating the coating on the distal end side with respect to the coating on the base end side from the incision position, and in the cutting step, the pressing force capable of realizing the calculated incision depth is applied to the cutting blade by the urging mechanism.

5. A coating removing device for a cable that removes a coating on an outer periphery of a core wire at a terminal portion of a cable, the coating removing device for a cable comprising:
a rotary head configured to rotate around a rotation axis set at a fixed position;
a rotation mechanism configured to rotationally driving the rotary head;
a cable holding mechanism configured to hold and fix the terminal portion of the cable in front of the rotary head with being aligned with the rotation axis and a distal end of the cable facing a rear side of the rotary head;
a cutting blade mounted on the rotary head so as to be displaceable in a radial direction of the rotary head, and configured to cause a cutting edge to make an incision on the coating at the terminal portion of the cable by displacing radially inward;
a gripping mechanism arranged on the more distal end side of the cable than the cutting blade and configured to grip the coating;
an opening and closing mechanism configured to open the cutting blade and the gripping mechanism radially outward and close the cutting blade and the gripping mechanism radially inward;
an urging mechanism configured to apply a pressing force in a cutting direction to the cutting blade and gripping mechanism during a closing operation by the opening and/or closing mechanism; and
a pulling-out mechanism having a function of relatively moving the rotary head and the cable holding mechanism along a rotation axis direction and configured to strip off the coating on the distal end side from the incision position by positioning the cutting blade and the gripping mechanism with respect to the cable in an axis direction by moving and stopping and by moving the rotary head and the cable holding mechanism in a direction in which they are separated from each other with the gripping mechanism gripping the coating at the terminal portion of the cable,.
wherein the opening and closing mechanism and urging mechanism are further configured to stop the cutting blade at a position before reaching the core wire and, from the position, open the cutting blade radially outward and away from the coating while maintaining a grip on the coating by the gripping mechanism.

6. The coating removing device for a cable according to claim 5,
wherein at least one of a spring and a fluid pressure cylinder is provided as the urging mechanism.

7. The coating removing device according to claim 5,
wherein the pulling out mechanism is further configured to strip off the coating in a state in which the opening and/or closing mechanism has opened the cutting blade radially outward and away from the coating while maintaining the grip on the coating by the gripping mechanism.

* * * * *